(12) United States Patent (10) Patent No.: US 12,165,363 B2
Suzuki (45) Date of Patent: Dec. 10, 2024

(54) APPARATUS, METHOD, AND STORAGE MEDIUM

(71) Applicant: CANON KABUSHIKI KAISHA, Tokyo (JP)

(72) Inventor: Takahiro Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 17/468,520

(22) Filed: Sep. 7, 2021

(65) Prior Publication Data

US 2022/0084251 A1 Mar. 17, 2022

(30) Foreign Application Priority Data

Sep. 14, 2020 (JP) .............................. JP2020-153585

(51) Int. Cl.
*G06K 9/00* (2022.01)
*G06T 7/90* (2017.01)

(52) U.S. Cl.
CPC ...... *G06T 7/90* (2017.01); *G06T 2207/10024* (2013.01)

(58) Field of Classification Search
None
See application file for complete search history.

(56) References Cited

U.S. PATENT DOCUMENTS

2007/0058858 A1* 3/2007 Harville .................. G06Q 30/02
382/165

FOREIGN PATENT DOCUMENTS

| JP | 2004321793 A | 11/2004 |
|---|---|---|
| JP | 2006050536 A | 2/2006 |
| JP | 2006254309 A | 9/2006 |
| JP | 2015111822 A | 6/2015 |
| JP | 2019216409 A | 12/2019 |
| JP | 2020088800 A | 6/2020 |

OTHER PUBLICATIONS

Sumriddetchkajorn et al., "Mobile device-based self-referencing colorimeter for monitoring chlorine concentration in water" (Year: 2013).*
Karlsen et al., "A smart phone-based robust correction algorithm for the colorimetric detection of urinary tract infection" (Year: 2015).*
Abdelhamed et al., "MarkWhite: an improved interactive white-balance method for smartphone cameras" (Year: 2019).*

* cited by examiner

*Primary Examiner* — SJ Park
(74) *Attorney, Agent, or Firm* — Canon U.S.A., Inc. IP Division

(57) ABSTRACT

An apparatus for evaluating color of an object includes an acquisition unit configured to acquire image data which is acquired by imaging the object and a color chart group including color charts having different reflectance within a one angle of view, an estimation unit configured to estimate a value of reference white under an exposure condition corresponding to the imaging based on the image data, and a calculation unit configured to calculate a color value for evaluating the color of the object based on the image data and the estimated value of the reference white.

20 Claims, 14 Drawing Sheets

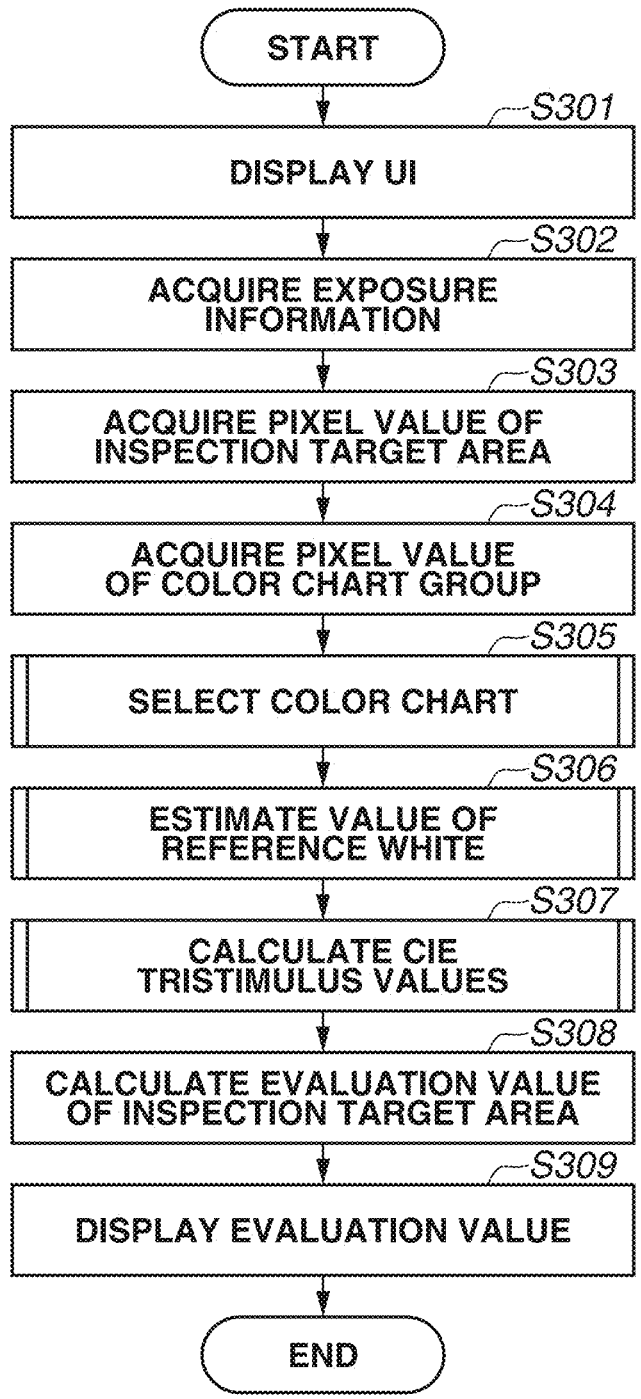

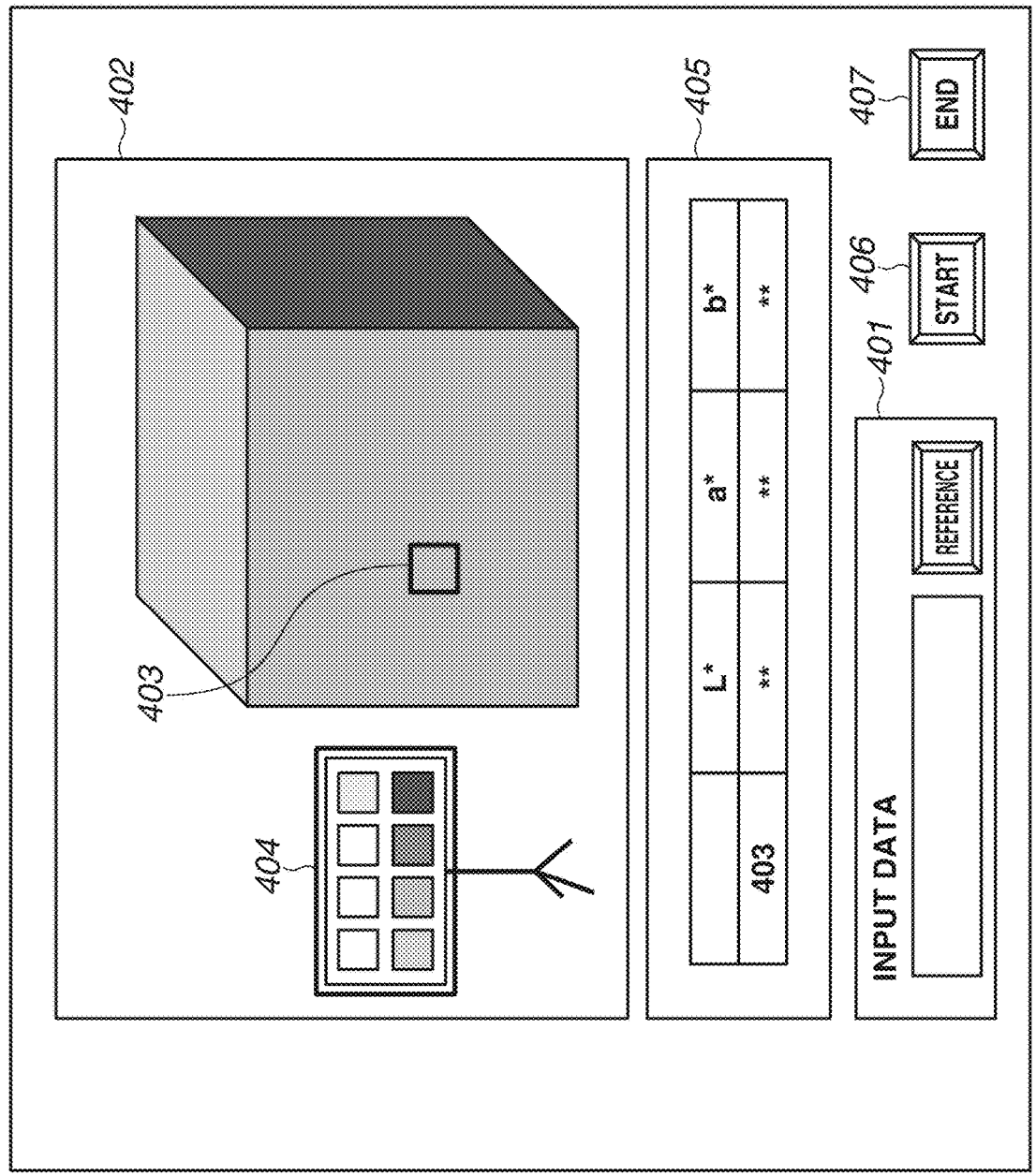

APPARATUS, METHOD, AND STORAGE MEDIUM

BACKGROUND OF THE DISCLOSURE

Field of the Disclosure

The aspect of the embodiments relates to an image processing technique for changing color of a color image.

Description of the Related Art

Digital cameras are increasingly used to inspect color of objects. For example, there is a technique for converting a pixel value in a captured image of an inspection object using a color profile generated in advance and a value of reference white and evaluating color of the inspection object. In the above-described color inspection technique, it is necessary to match an exposure condition at the time when imaging is performed for generating the color profile and an exposure condition at the time of imaging an inspection object. Therefore, it is common to set an appropriate exposure condition based on an illumination environment at the time of inspection, and performing imaging by unifying an exposure condition to the set appropriate exposure condition.

However, in a case where an inspection object has a dark color such as black and navy, a signal-to-noise (S/N) ratio of a pixel value may be deteriorated due to insufficient light amount in imaging under the set appropriate exposure condition, and color inspection cannot be accurately performed as a result. In this regard, Japanese Patent Application Laid-Open No. 2019-216409 discusses a technique for capturing images of a measurement target object and a white board under different exposure conditions and correcting a pixel value in the captured image of the white board based on a difference between the exposure conditions.

However, according to the technique discussed in Japanese Patent Application Laid-Open No. 2019-216409, it is necessary to perform imaging separately for an inspection object and for reference white.

SUMMARY OF THE DISCLOSURE

According to an aspect of the embodiments, an apparatus for evaluating color of an object includes an acquisition unit configured to acquire image data which is acquired by imaging the object and a color chart group including color charts having different reflectance within one angle of view, an estimation unit configured to estimate a value of reference white under an exposure condition corresponding to the imaging based on the image data, and a calculation unit configured to calculate a color value for evaluating the color of the object based on the image data and the estimated value of the reference white.

Further features of the disclosure will become apparent from the following description of exemplary embodiments with reference to the attached drawings.

BRIEF DESCRIPTION OF THE DRAWINGS

FIG. 3 is a flowchart illustrating processing performed by the image processing apparatus.

FIG. 4 illustrates an example of a user interface.

DESCRIPTION OF THE EMBODIMENTS

Various exemplary embodiments of the disclosure will be described in detail below with reference to the attached drawings. The exemplary embodiments described below do not necessarily limit the disclosure. Further, not all combinations of features described in the exemplary embodiments are essential for solving means of the disclosure.

According to a first exemplary embodiment, imaging is performed so as to include an inspection object and a color chart group for reference white within a same angle of view, a color chart is selected from the color chart group according to whether a pixel value is saturated, and a value of the reference white is estimated based on a pixel value corresponding to the selected color chart. An inspection object according to the present exemplary embodiment is a dark-colored object. An example of a dark color is a color in a case where a metal painted in a color such as black and navy is observed in a direction different from a regular reflection direction of incident light from illumination.

<Hardware Configuration of Image Processing Apparatus>

Figure 1:
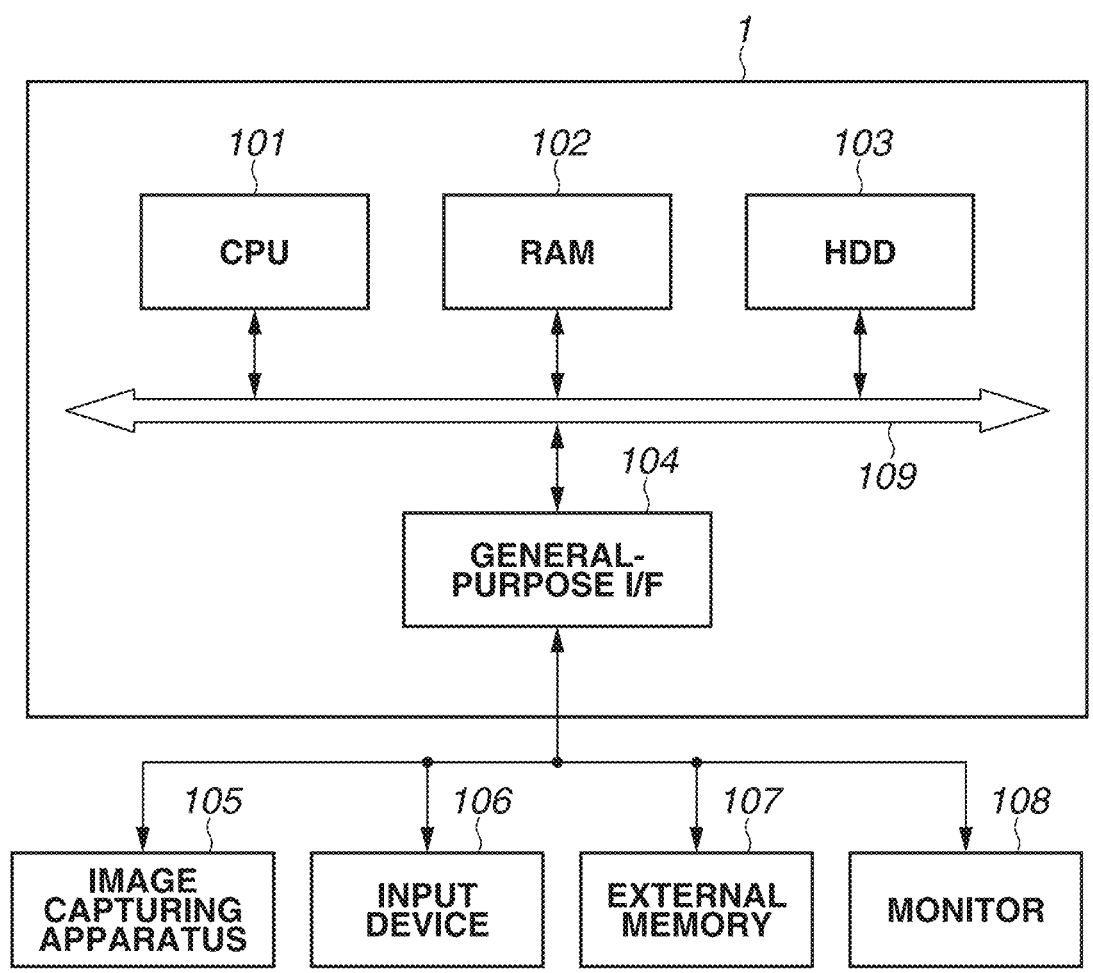
FIG. 1 is a block diagram illustrating a hardware configuration of an image processing apparatus.

A hardware configuration of an image processing apparatus 1 according to the present exemplary embodiment will be described with reference to FIG. 1. The image processing apparatus 1 includes a central processing unit (CPU) 101, a random access memory (RAM) 102, a hard disk drive (HDD) 103, a general-purpose interface (I/F) 104, and a main bus 109. The general-purpose I/F 104 is an interface for connecting an image capturing apparatus 105 such as a digital camera, an input device 106 such as a mouse and a keyboard, an external memory 107 such as a memory card, and a monitor 108 to the main bus 109.

Various types of processing which are realized by the CPU 101 operating various types of software (computer programs) stored in the HDD 103 will now be described. First, the CPU 101 starts an image processing application stored in the HDD 103, loads the image processing application to the RAM 102, and displays a user interface (UI) on the monitor 108.

Then, various data stored in the HDD 103 and the external memory 107, image data generated in the image capturing apparatus 105, a user instruction via the input device 106, and the like are transferred to the RAM 102. Further, various calculations are performed on the image data stored in the RAM 102 based on an instruction from the CPU 101 according to processing in the image processing application.

Calculation results are displayed on the monitor 108 and stored in the HDD 103 and the external memory 107.

<Logical Configuration of Image Processing Apparatus>

Figure 2:
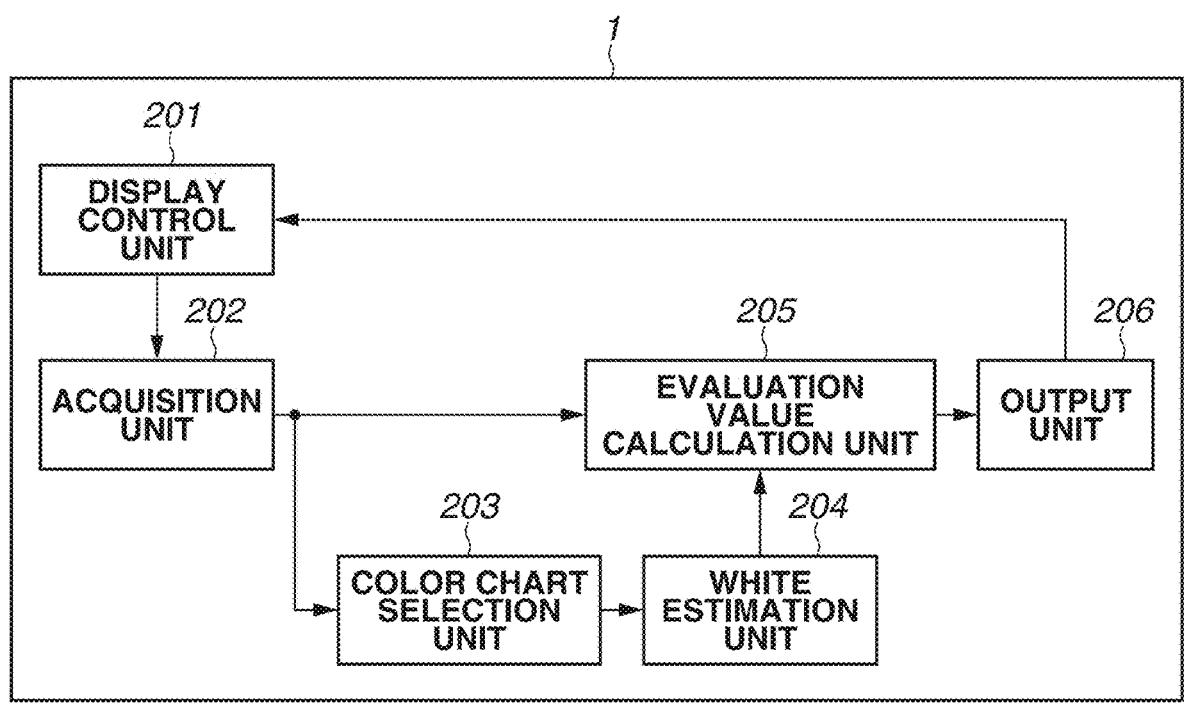
FIG. 2 is a block diagram illustrating a logical configuration of the image processing apparatus.

FIG. 2 is a block diagram illustrating a logical configuration of the image processing apparatus 1. The image processing apparatus 1 functions as the logical configuration illustrated in FIG. 2 by the CPU 101 executing a program stored in the HDD 103 using the RAM 102 as a work memory. Not all of processing described below need to be executed by the CPU 101, and the image processing apparatus 1 may be configured so that a part or all of the processing is executed by one or a plurality of processing circuits other than the CPU 101.

The image processing apparatus 1 includes a display control unit 201, an acquisition unit 202, a color chart selection unit 203, a white estimation unit 204, an evaluation value calculation unit 205, and an output unit 206. The display control unit 201 displays a UI for receiving an instruction input from a user on the monitor 108. FIG. 4 illustrates an example of a UI to be displayed according to the present exemplary embodiment. A specifying area 401 is an area for a user to specify image data which is obtained by performing imaging so as to include an inspection object and a color chart group for reference white within the same angle of view.

An image represented by the image data specified by the user is displayed in an image display area 402. A specifying area 403 is an area for the user to specify an inspection target area. A specifying area 404 is an area for the user to specify the color chart group. A color value corresponding to the inspection target area specified by the user is displayed in a color value display area 405. A start button 406 is a button to start processing for calculating a color value for color evaluation of the inspection object in response to an instruction input from the user. An end button 407 is a button to execute an operation to end the processing in response to an instruction input from the user.

Figures 5A, 5B:
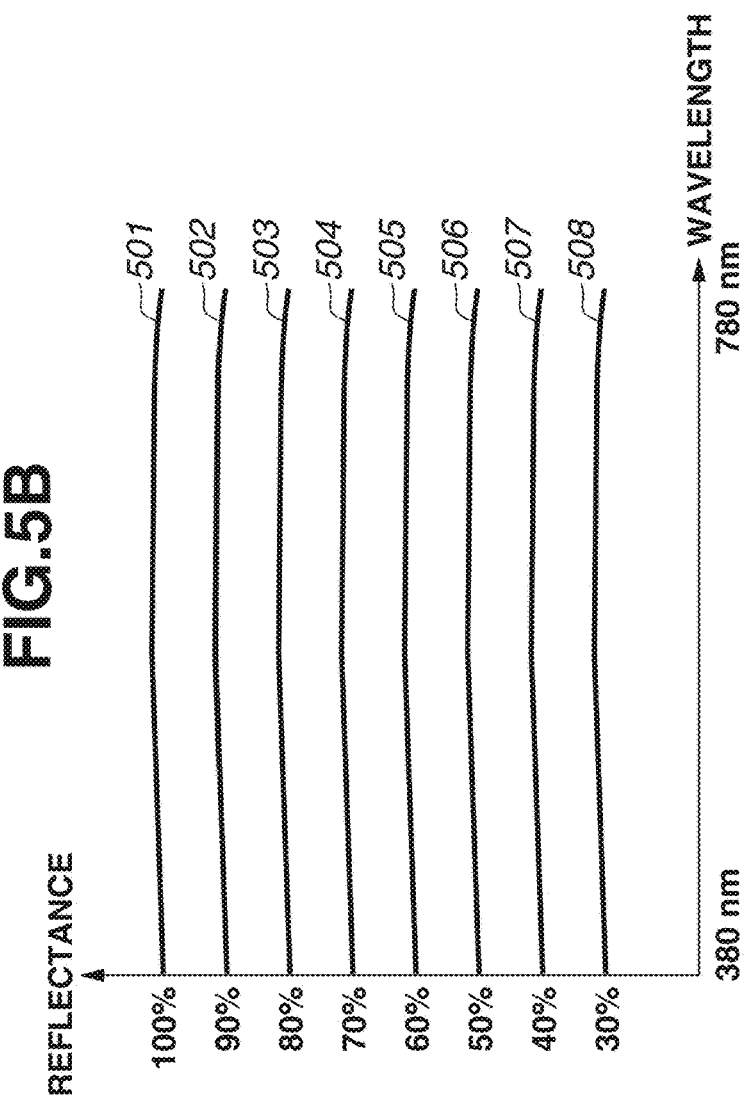
FIGS. 5A and 5B illustrate an example of a gray color chart group.

The acquisition unit 202 acquires a pixel value corresponding to the inspection target area from the image represented by the image data specified by the user and a pixel value corresponding to the color chart group. The acquisition unit 202 further acquires exposure information indicating an exposure condition at the time of imaging. According to the present exemplary embodiment, imaging is performed so as to include the inspection object and the color chart group for the reference white within the same angle of view as described above. The color chart included in the color chart group according to the present exemplary embodiment is an achromatic gray color chart. FIGS. 5A and 5B illustrate an example of a gray color chart group according to the present exemplary embodiment. As illustrated in FIG. 5A, the gray color chart group includes eight types of gray color charts from a color chart 501 to a color chart 508. As illustrated in FIG. 5B, spectral reflectance of the gray color charts are approximately 100% to 30% in decrements of 10%. The color chart selection unit 203 selects the color chart to be used for estimating a value of the reference white based on the pixel value corresponding to the color chart group acquired by the acquisition unit 202. The white estimation unit 204 estimates the value of the reference white based on the pixel value corresponding to the selected color chart. The evaluation value calculation unit 205 calculates a color value (an evaluation value) corresponding to the inspection target area based on the pixel value corresponding to the inspection target area, the exposure information, and the value of the reference white. The output unit 206 outputs the calculated color value corresponding to the inspection target area. The output unit 206 according to the present exemplary embodiment displays the color value corresponding to the inspection target area in the color value display area 405.

<Processing in Image Processing Apparatus>

FIG. 3 is a flowchart illustrating processing performed in the image processing apparatus 1. The processing illustrated in the flowchart in FIG. 3 is started if a user inputs an instruction via the input device 106, and the CPU 101 receives the input instruction. Hereinbelow, each step (process) is represented by a letter S followed by a reference numeral.

In step S301, the display control unit 201 displays the UI for receiving an instruction input from the user on the monitor 108. Specifically, if specification of the image data is received in the specifying area 401, the display control unit 201 displays an image represented by the specified image data in the image display area 402. The display control unit 201 receives specification of the inspection target area and the color chart group in the specifying areas 403 and 404 and advances the processing to step S302 if the start button 406 is pressed.

In step S302, the acquisition unit 202 acquires the exposure information indicating the exposure condition corresponding to the image data specified by the user. The exposure information includes a shutter speed (TV), an aperture value (AV), and sensitivity (ISO) and can be acquired from exchangeable image file format (Exif) information of the image data.

Hereinbelow, the shutter speed, the aperture value, and the sensitivity acquired in step S302 are respectively denoted by $TV_{img}$, $AV_{img}$, and $ISO_{img}$.

In step S303, the acquisition unit 202 acquires the pixel value corresponding to the inspection target area from the image represented by the image data specified by the user. In a case where the inspection target area includes a plurality of pixels, the acquisition unit 202 acquires a pixel value group corresponding to the inspection target area and calculates an average value of the pixel value group. Hereinbelow, the average value of the pixel value group is treated as the pixel value corresponding to the inspection target area.

The pixel value of the image represented by the image data specified by the user is red-green-blue (RGB) values (R, G, B). Hereinbelow, the pixel values corresponding to the inspection target area are denoted by RGB values ($R_{img}$, $G_{img}$, $B_{img}$).

In step S304, the acquisition unit 202 acquires the pixel value corresponding to the color chart group from the image represented by the image data specified by the user. Specifically, in a case where each of the eight gray color charts is individually specified in the specifying area 404, the acquisition unit 202 acquires each pixel value (or the average value of the pixel value group). In a case where the gray color chart group is collectively specified in the specifying area 404, the acquisition unit 202 acquires each pixel value (or the average value of the pixel value group) based on a position of each gray color chart calculated by a known method.

In step S305, the color chart selection unit 203 selects the color chart to be used for estimating the value of the reference white based on the pixel value corresponding to the color chart group acquired in step S304. The processing for selecting the color chart to be used for estimating the value of the reference white will be described in detail below. In step S306, the white estimation unit 204 estimates the value of the reference white based on the pixel value corresponding to the selected color chart. The processing for estimating the value of the reference white will be described in detail below. In step S307, the evaluation value calculation unit 205 calculates Commission Internationale de l'Eclairage (CIE) tristimulus values corresponding to the inspection target area and the reference white based on the pixel value corresponding to the inspection target area, the exposure information, and the value of the reference white. The processing for calculating the CIE tristimulus values corresponding to the inspection target area and the reference white will be described in detail below.

In step S308, the evaluation value calculation unit 205 calculates an evaluation value corresponding to the inspection target area based on the CIE tristimulus values corresponding to the inspection target area and the reference white. The evaluation value according to the present exemplary embodiment is CIELAB values (L*, a*, b*). Specifically, the evaluation value calculation unit 205 converts the CIE tristimulus values into the CIELAB values (L*, a*, b*) according to following equations (1), (2), (3), (4), and (5):

$$\left. \begin{array}{l} \text{for } X/X_W > 0.00856, \\ XRate = (X/X_W)^{1/3}, \\ \text{for } X/X_W > 0.00856, \\ XRate = 7.787*(X/X_W) + 16.0/116.0, \end{array} \right\} \quad (1)$$

$$\left. \begin{array}{l} \text{for } Y/Y_W > 0.00856, \\ YRate = (Y/Y_W)^{1/3}, \\ \text{for } Y/Y_W > 0.00856, \\ YRate = 7.787*(Y/Y_W) + 16.0/116.0, \end{array} \right\} \quad (2)$$

$$\left. \begin{array}{l} \text{for } Z/Z_W > 0.00856, \\ ZRate = (Z/Z_W)^{1/3}, \\ \text{for } Z/Z_W > 0.00856, \\ ZRate = 7.787*(Z/Z_W) + 16.0/116.0, \end{array} \right\} \quad (3)$$

$$\left. \begin{array}{l} \text{for } Y/Y_W > 0.00856, \\ L^* = 116.0*(Y/Y_W)^{1/3} - 16.0, \\ \text{for } Y/Y_W > 0.00856, \\ L^* = 903.29*(Y/Y_W), \end{array} \right\} \quad (4)$$

$$\left. \begin{array}{l} a^* = 500*(XRate - YRate), \\ b^* = 200*(YRate - ZRate), \end{array} \right\} \quad (5)$$

where, (X, Y, Z) are the CIE tristimulus values corresponding to the inspection target area, and $(X_W, Y_W, Z_W)$ are the CIE tristimulus values of the reference white.

In step S309, the output unit 206 displays the CIELAB values (L*, a*, b*) corresponding to the inspection target area on the color value display area 405.

<Processing for Selecting Color Chart Used for Estimating Value of Reference White>

Figure 6:
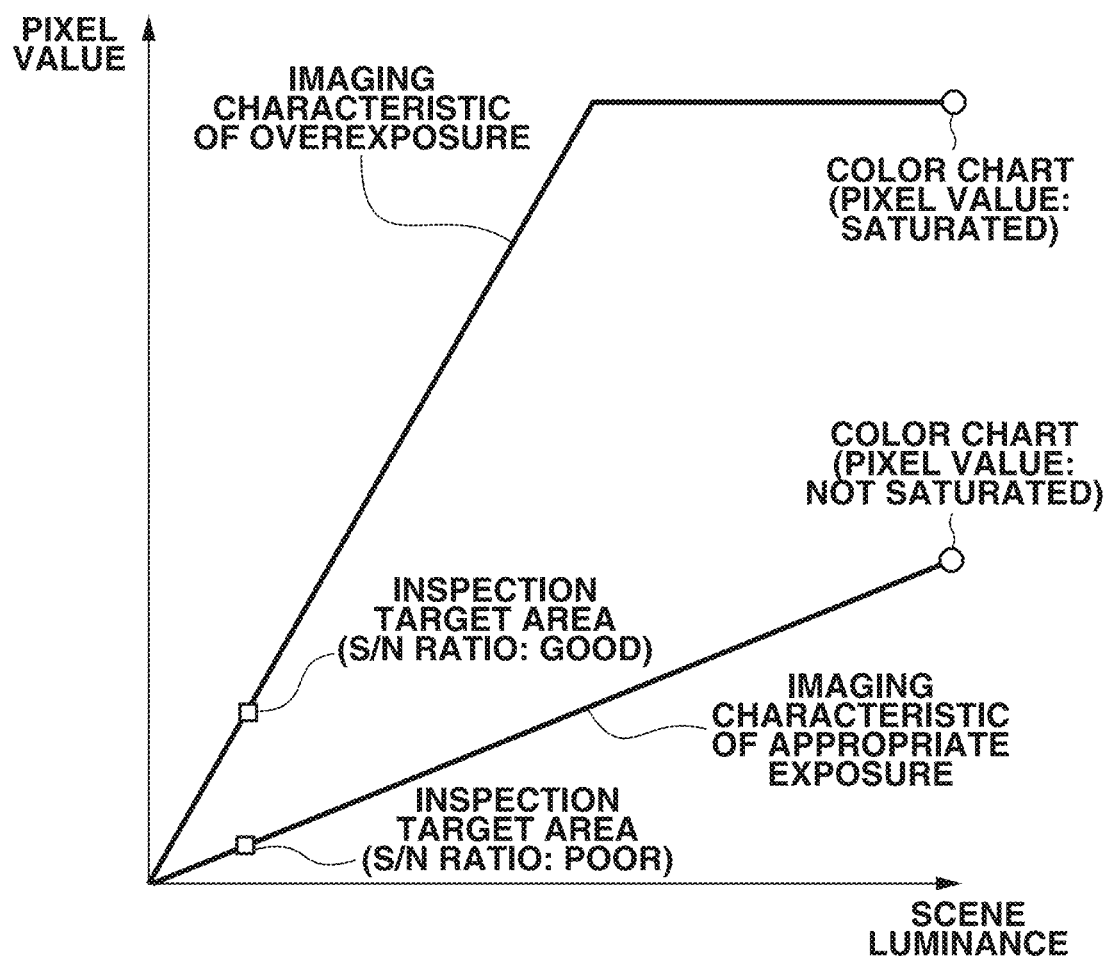
FIG. 6 illustrates saturation of a pixel value.

An outline of the processing for selecting the color chart used for estimating the value of the reference white will be described. In step S305, the color chart selection unit 203 selects the gray color chart the pixel value of which is not saturated in the captured image from the gray color chart group. Saturation of the pixel value will be described with reference to FIG. 6. An image sensor of a digital camera performs photoelectric conversion in a photoelectric conversion element which accumulates an electric charge according to an amount of incident light. Therefore, the pixel value is recorded substantially linearly with respect to the amount of incident light. However, if the light exceeding a dynamic range of the image sensor is received, linearity of the pixel value with respect to the amount of incident light cannot be maintained. In this regard, it is common practice to adjust the amount of light incident on the image sensor by an exposure setting and perform imaging so that the above-described linearity is maintained. FIG. 6 illustrates an imaging characteristic corresponding to appropriate exposure.

In a case where imaging is performed on a dark-colored inspection object, the imaging is performed with overexposure instead of the appropriate exposure so that a signal-to-noise (S/N) ratio of the pixel value is not deteriorated, and thus the pixel value corresponding to a bright area (high luminance area) in an imaging scene is saturated. FIG. 6 also illustrates an imaging characteristic corresponding to the overexposure. As described in the present exemplary embodiment, in a case where the dark-colored inspection object and the color chart for the reference white are imaged so as to be included within the same angle of view, the imaging is performed under the exposure condition suitable for the dark-colored inspection object, and thus the pixel value corresponding to the color chart for the reference white is saturated. Therefore, according to the present exemplary embodiment, the gray color chart of which the pixel value is not saturated is selected in an image captured under the exposure condition suitable for the dark-colored inspection object, and the value of the reference white are estimated based on the selected gray color chart.

Figure 7:
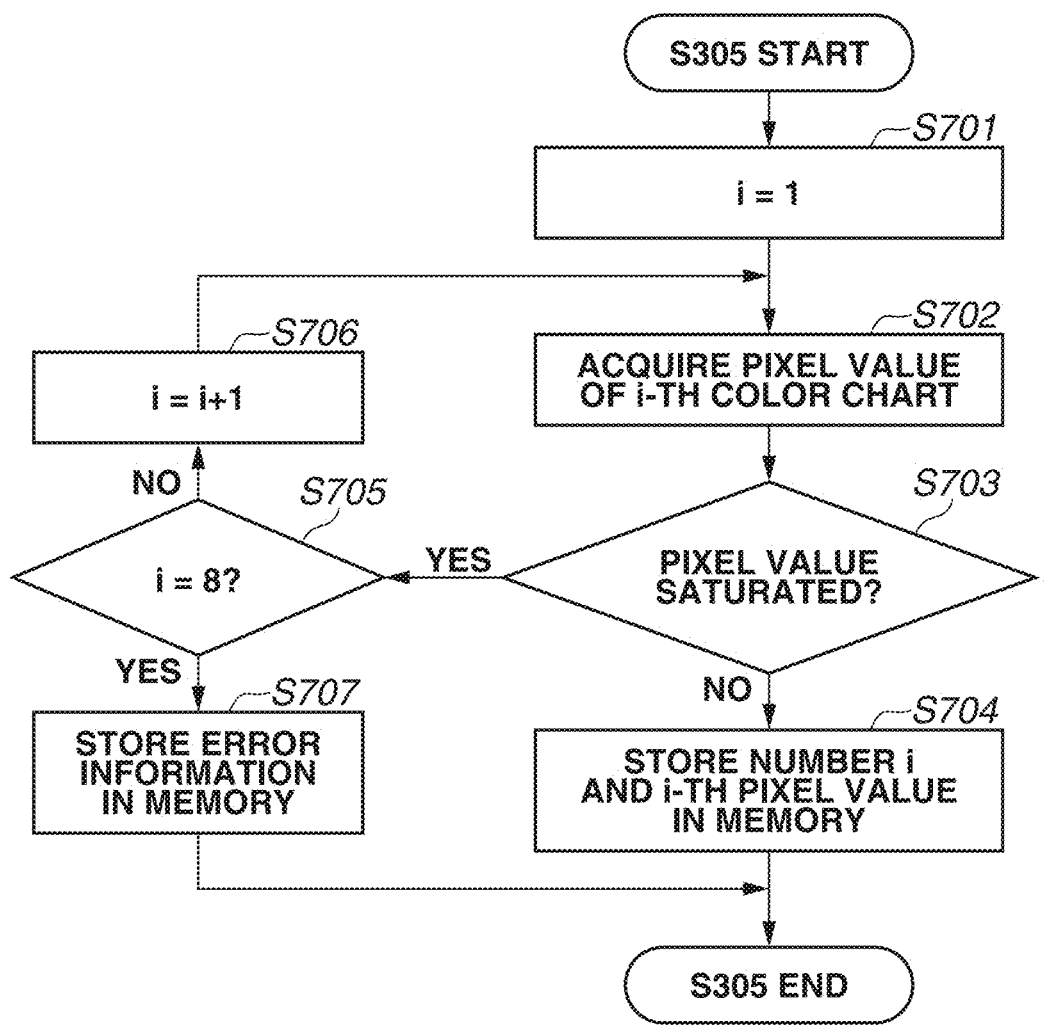
FIG. 7 is a flowchart illustrating processing for selecting a color chart.

FIG. 7 is a flowchart illustrating the processing for selecting the color chart used for estimating the value of the reference white. In step S701, the color chart selection unit 203 sets a counter i of the gray color chart to 1. According to the present exemplary embodiment, the number of the gray color charts is eight, so that a maximum value of the counter is eight. The gray color charts are numbered in descending order of the spectral reflectance.

In step S702, the color chart selection unit 203 acquires the pixel value corresponding to an i-th gray color chart. In step S703, the color chart selection unit 203 determines whether the pixel value corresponding to the i-th gray color chart acquired in step S702 is saturated. For example, in a case where the pixel value of the captured image is recorded in 8 bits, a maximum signal value of each of R, G, and B channels is 255. Therefore, in a case where imaging of an area having scene luminance higher than scene luminance corresponding to the signal value of 255 is performed under the exposure condition suitable for the dark-colored inspection object, the pixel value is saturated. The color chart selection unit 203 determines whether a value of each channel in the pixel value corresponding to the gray color chart is 255. In a case where the value of at least one channel is 255, the color chart selection unit 203 determines that the pixel value corresponding to the gray color chart is saturated. In a case where the pixel value is saturated (YES in step S703), the processing proceeds to step S705. Whereas, in a case where the pixel value is not saturated (NO in step S703), the processing proceeds to step S704.

In step S704, the color chart selection unit 203 stores the number i and the pixel value of the gray color chart in the memory and terminates the processing in step S305. In step S705, the color chart selection unit 203 performs determination with respect to the counter i. In a case of i=8 (YES in step S705), the pixel values corresponding to all of the gray color charts are saturated, so that the color chart selection unit 203 advances the processing to step S707, stores error information in the memory, and terminates the processing in step S305. In a case of i≠8 (NO in step S705), the color chart selection unit 203 advances the processing to step S706 to perform determination with respect to a next gray color chart, updates the counter i, and returns the processing to step S702.

The processing is performed as described above, so that the gray color chart having the highest reflectance can be selected from among the gray color charts the pixel values of which are not saturated. The gray color chart having the highest reflectance is selected, and thus the value of the reference white can be estimated using data in which the pixel value is not saturated and which has the best S/N ratio.

<Processing for Estimating Value of Reference White>

Figure 8:
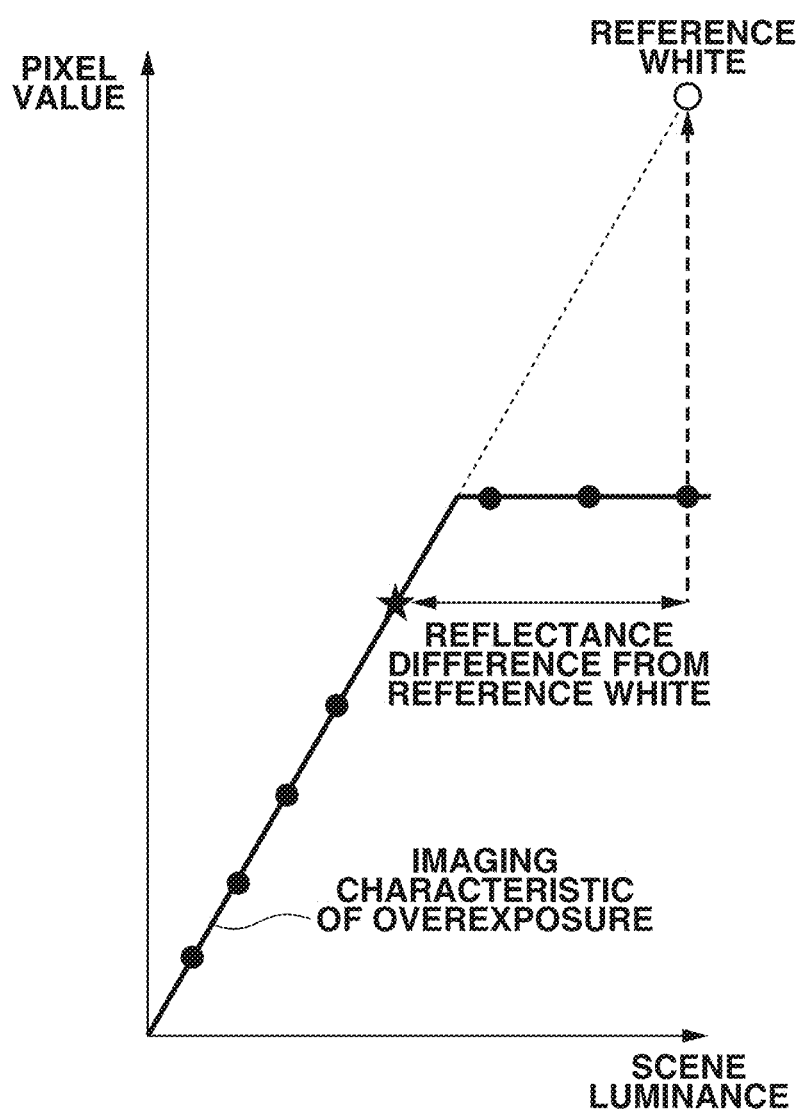
FIG. 8 illustrates an outline of processing for estimating a value of reference white.

An outline of the processing for estimating the value of the reference white will be described with reference to FIG. 8. In step S306, the white estimation unit 204 estimates the value of the reference white corresponding to imaging under the exposure condition suitable for the dark-colored inspection object based on the pixel value corresponding to the gray color chart selected in step S305. As illustrated in FIG. 8, the exposure condition according to the present exemplary embodiment is the overexposure. In FIG. 8, a black circle indicates each gray color chart included in the gray color chart group, and a star indicates the gray color chart to be selected. The gray color chart in which the pixel value is not saturated and which has the highest reflectance is selected from the gray color chart group imaged in the overexposure. The white estimation unit 204 estimates the value of the reference white indicated by a white circle in FIG. 8 based on the pixel value corresponding to the selected gray color chart.

Figure 9:
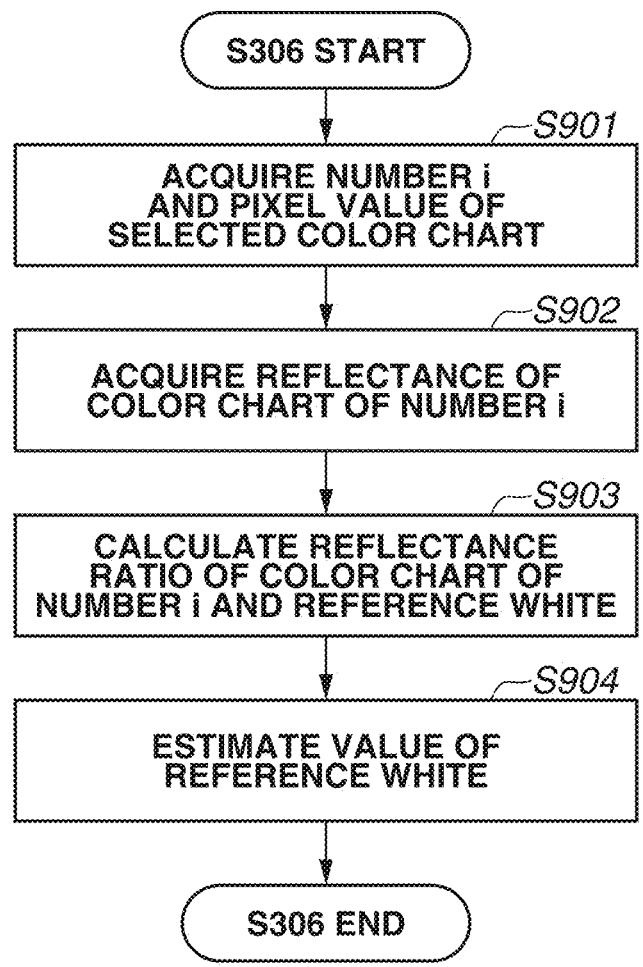
FIG. 9 is a flowchart illustrating processing for estimating a value of reference white.

FIG. 9 is a flowchart illustrating the processing for estimating the value of the reference white. In step S901, the white estimation unit 204 acquires the number i and the pixel value of the gray color chart selected in step S305. In step S902, the white estimation unit 204 acquires the spectral reflectance of the gray color chart of the number i. According to the present exemplary embodiment, the following processing will be described on the assumption that the gray color chart of the number i=4 is selected in step S305, and the spectral reflectance of the gray color chart of the number i=4 is 70% in an entire wavelength range of visible light.

In step S903, the white estimation unit 204 calculates a ratio of the spectral reflectance of the gray color chart of the number i and the spectral reflectance of the reference white. If it is assumed that the spectral reflectance of the reference white is 100% in the entire wavelength range of visible light, the calculated ratio of the spectral reflectances is expressed as a following equation (6):

$$\text{ratio} = \frac{100}{70}. \tag{6}$$

In step S904, the white estimation unit 204 estimates the value of the reference white corresponding to imaging in the overexposure based on the ratio of the spectral reflectances using a following equation (7):

$$\begin{cases} R_W = \text{ratio} * R_4, \\ G_W = \text{ratio} * G_4, \\ B_W = \text{ratio} * B_4. \end{cases} \tag{7}$$

In the equation (7), $R_4$, $G_4$, and $B_4$ are the pixel values of the gray color chart of the number i=4, and $R_W$, $G_W$, and $B_W$ are the values of the reference white.

<Processing for Calculating CIE Tristimulus Values Corresponding to Inspection Target Area and Reference White>

Figure 10:
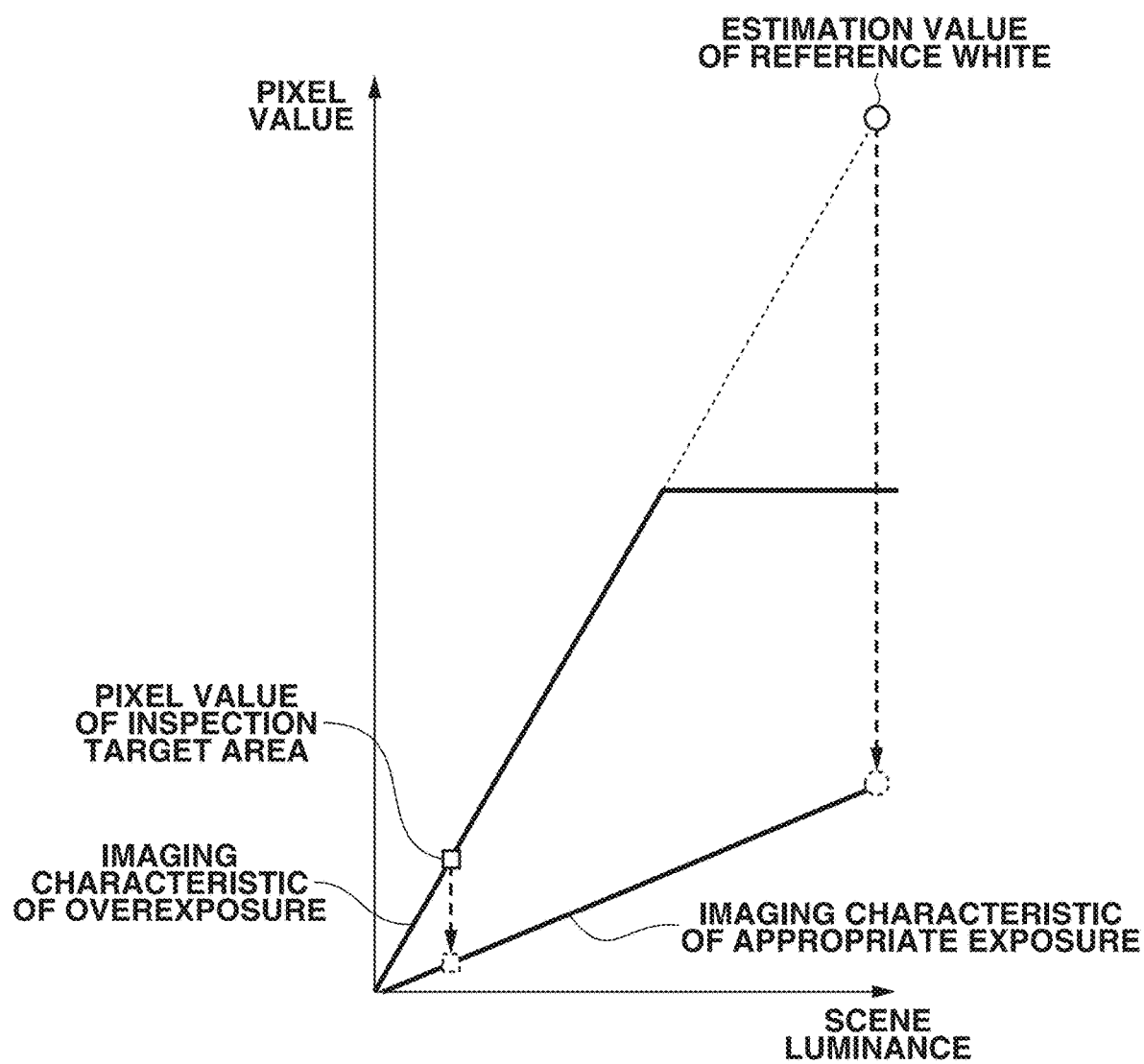
FIG. 10 illustrates an outline of processing for calculating Commission Internationale de l'Eclairage (CIE) tristimulus values.

An outline of the processing for calculating the CIE tristimulus values corresponding to the inspection target area and the reference white will be described with reference to FIG. 10. In step S307, the evaluation value calculation unit 205 converts the pixel value corresponding to the inspection target area and the value of the reference white into the CIE tristimulus values. Specifically, the evaluation value calculation unit 205 converts the pixel values ($R_{img}$, $G_{img}$, $B_{img}$) corresponding to the inspection target area into the CIE tristimulus values (X, Y, Z) and converts the values ($R_W$, $G_W$, $B_W$) of the reference white into the CIE tristimulus values ($X_W$, $Y_W$, $Z_W$).

The exposure condition according to the present exemplary embodiment is the overexposure with respect to the appropriate exposure in consideration of the S/N ratio of the pixel value. However, a color profile for converting from the RGB values into the CIE tristimulus values is generally generated in the appropriate exposure for a scene in order to correspond to inspection targets having various colors. Therefore, in order to calculate the CIE tristimulus values using a general color profile, correction processing for correcting a pixel value of an image captured in the overexposure into a value equivalent to the appropriate exposure is performed. The correction processing is indicated as dotted line arrows in FIG. 10. Therefore, the evaluation value calculation unit 205 respectively converts the pixel value corresponding to the inspection target area and the value of the reference white into values equivalent to the appropriate exposure based on a difference between the overexposure and the appropriate exposure. Further, the evaluation value calculation unit 205 calculates the CIE tristimulus values using the converted values and the color profile.

Figure 11:
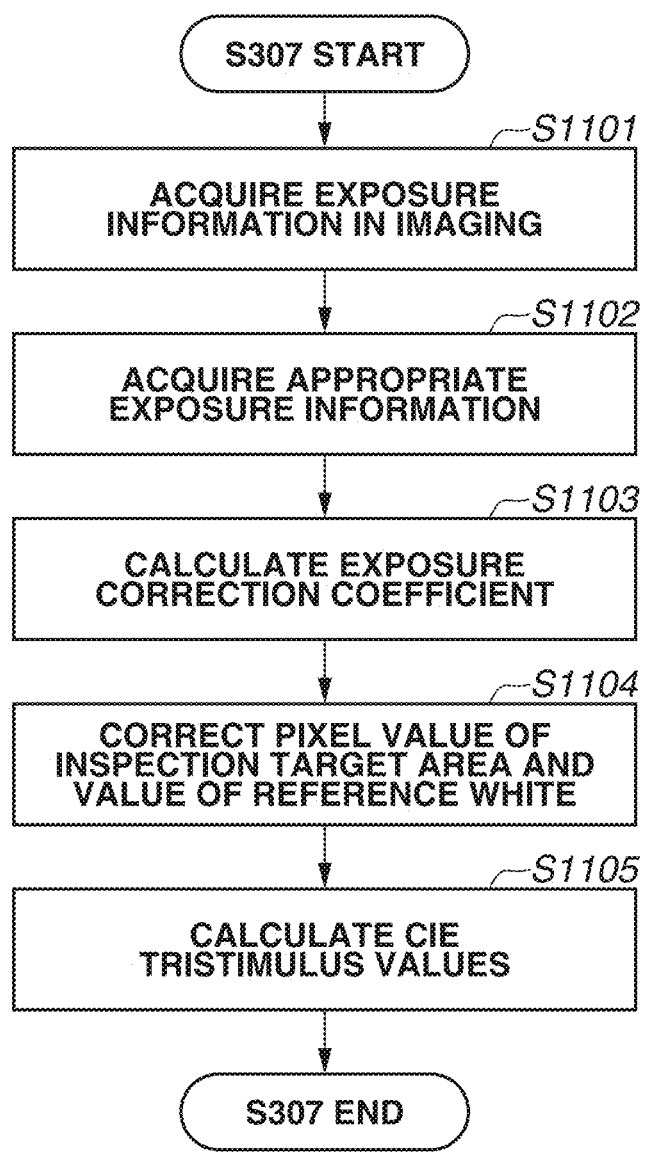
FIG. 11 is a flowchart illustrating processing for calculating CIE tristimulus values.

FIG. 11 is a flowchart illustrating the processing for calculating the CIE tristimulus values corresponding to the inspection target area and the reference white. In step S1101, the evaluation value calculation unit 205 acquires the exposure information ($TV_{img}$, $AV_{img}$, $ISO_{img}$) in imaging of the inspection object and the color chart group. In step S1102, the evaluation value calculation unit 205 acquires the exposure information corresponding to the appropriate exposure. The appropriate exposure is determined based on an illumination environment in the imaging, and the exposure information corresponding to the appropriate exposure is acquired by measurement using an exposure meter. Hereinbelow, the exposure information corresponding to the appropriate exposure are denoted by a shutter speed $TV_{ref}$, an aperture value $AV_{ref}$, and a sensitivity $ISO_{ref}$.

In step S1103, the evaluation value calculation unit 205 calculates exposure correction coefficients for correcting the pixel value corresponding to the inspection target area and the value of the reference white. The evaluation value calculation unit 205 calculates exposure correction coefficients ($\alpha$, $\beta$, $\gamma$) respectively corresponding to the shutter speed, the aperture value, and the sensitivity according to following equations (8), (9), and (10):

$$\alpha = TV_{ref}/TV_{img}, \tag{8}$$

$$\beta = (AV_{img}/AV_{ref})^2, \tag{9}$$

$$\gamma = ISO_{ref}/ISO_{img}. \tag{10}$$

Further, the evaluation value calculation unit 205 calculates a total exposure correction coefficient $\delta$ by integrating the exposure correction coefficients ($\alpha$, $\beta$, $\gamma$) according to a following equation (11), $$\delta = \alpha * \beta * \gamma. \quad (11)$$

The exposure correction coefficient will be described using specific numerical values. For example, it is assumed that the shutter speed $TV_{ref}$, the aperture value $AV_{ref}$, and the sensitivity $ISO_{ref}$ corresponding to the appropriate exposure are respectively 1/200, F8, and 200. Meanwhile, it is assumed that the shutter speed $TV_{img}$, the aperture value $AV_{img}$, and the sensitivity $ISO_{img}$ in the imaging of the inspection object and the color chart group are respectively 1/50, F8, and 200, and the imaging is performed in the overexposure rather than the appropriate exposure. In this case, if the exposure correction coefficient δ is calculated according to the equation (11), the exposure correction coefficient δ is 1/4. As described above, in step S1103, the exposure correction coefficient is calculated according to an exposure difference.

In step S1104, the evaluation value calculation unit 205 corrects the pixel value corresponding to the inspection target area and the value of the reference white using the exposure correction coefficient δ calculated in step S1103. Specifically, the evaluation value calculation unit 205 corrects the pixel values ($R_{img}$, $G_{img}$, $B_{img}$) corresponding to the inspection target area and the values ($R_W$, $G_W$, $B_W$) of the reference white according to following equations (12) and (13):

$$\begin{cases} R'_{img} = \delta * R'_{img}, \\ G'_{img} = \delta * G'_{img}, \\ B'_{img} = \delta * B'_{img}, \end{cases} \quad (12)$$

$$\begin{cases} R'_W = \delta * R'_W, \\ G'_W = \delta * G'_W, \\ B'_W = \delta * B'_W. \end{cases} \quad (13)$$

In the equations (12) and (13), ($R_{img}'$, $G_{img}'$, $B_{img}'$) are the corrected pixel values corresponding to the inspection target area, and ($R_W'$, $G_W'$, $B_W'$) are the corrected values of the reference white.

In step S1105, the evaluation value calculation unit 205 converts the values ($R_{img}'$, $G_{img}'$, $B_{img}'$) and ($R_W'$, $G_W'$, $B_W'$) obtained by the correction in step S1104 into the CIE tristimulus values. In the conversion into the CIE tristimulus values, a color profile generated in advance under an appropriate exposure condition is used. There are various formats for the color profile, and according to the present exemplary embodiment, the format of the color profile is a 3*3 matrix. The evaluation value calculation unit 205 converts the pixel values ($R_{img}'$, $G_{img}'$, $B_{img}'$) corresponding to the inspection target area into the CIE tristimulus values (X, Y, Z) and converts the values ($R_W'$, $G_W'$, $B_W'$) of the reference white into the CIE tristimulus values ($X_W$, $Y_W$, $Z_W$) using a following equation (14):

$$\begin{bmatrix} X \\ Y \\ Z \end{bmatrix} = \begin{bmatrix} m_{00} & m_{01} & m_{02} \\ m_{10} & m_{11} & m_{12} \\ m_{20} & m_{21} & m_{22} \end{bmatrix} \begin{bmatrix} R \\ G \\ B \end{bmatrix}, \quad (14)$$

where $m_{00}$ to $m_{22}$ are nine matrix coefficients in the color profile.

Effect of First Exemplary Embodiment

As described above, the image processing apparatus according to the present exemplary embodiment is the image processing apparatus which evaluates color of an object and acquires image data acquired by performing imaging so as to include the object and a group of color charts each having different reflectance within the same angle of view. The image processing apparatus estimates the value of the reference white under the exposure condition corresponding to the imaging based on the acquired image data and calculates a color value for evaluating the color of the object based on the image data and the estimated value of the reference white. Accordingly, even in a case where an inspection object has a dark color, a color value for evaluating the color of the inspection object can be acquired without separately performing imaging for the inspection object and for the reference white.

A second exemplary embodiment will now be described. According to the first exemplary embodiment, a value of the reference white is estimated using a group of gray color charts reflectance of which is substantially constant with respect to a wavelength. According to the present exemplary embodiment, a value of reference white is estimated using a group of color charts of which reflectance is different for each wavelength. A hardware configuration and a functional configuration of an image processing apparatus according to the present exemplary embodiment are the same as those according to the first exemplary embodiment, so that the description thereof will be omitted. Hereinbelow, processing in step S306, which is different between the present exemplary embodiment and the first exemplary embodiment, will be mainly described. The configurations which are the same as those according to the first exemplary embodiment will be described with the same reference numerals.

<Processing for Estimating Value of Reference White>

Figure 12:
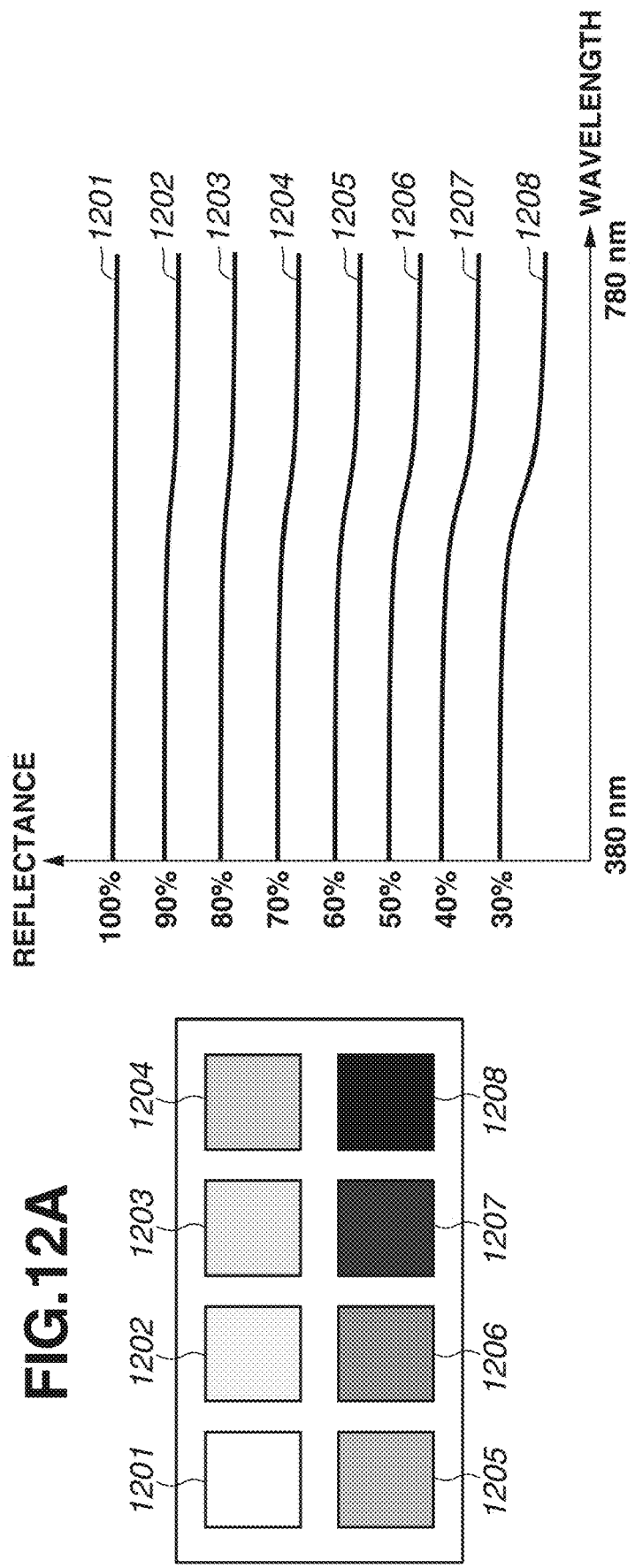
FIGS. 12A and 12B illustrate an example of a color chart group.

Reflectance of a color chart for estimating a value of the reference white may not be spectrally constant depending on a coloring material used for printing and the like. A color chart group used according to the present exemplary embodiment includes the color chart which is generated using a coloring material having a higher light absorption rate on a long wavelength side than on a short wavelength side. FIGS. 12A and 12B illustrate an example of the color chart group according to the present exemplary embodiment. As illustrated in FIG. 12A, the color chart group includes eight types of color charts from a color chart 1201 to a color chart 1208. As illustrated in FIG. 12B, it can be seen that reflectance of the color chart 1208 having low reflectance is relatively lower on the long wavelength side than on the short wavelength side compared with the color chart 1201 having high reflectance. Hereinbelow, processing for estimating the value of the reference white in a case where the reflectance of the color chart is not constant with respect to a wavelength will be described.

Figure 13:
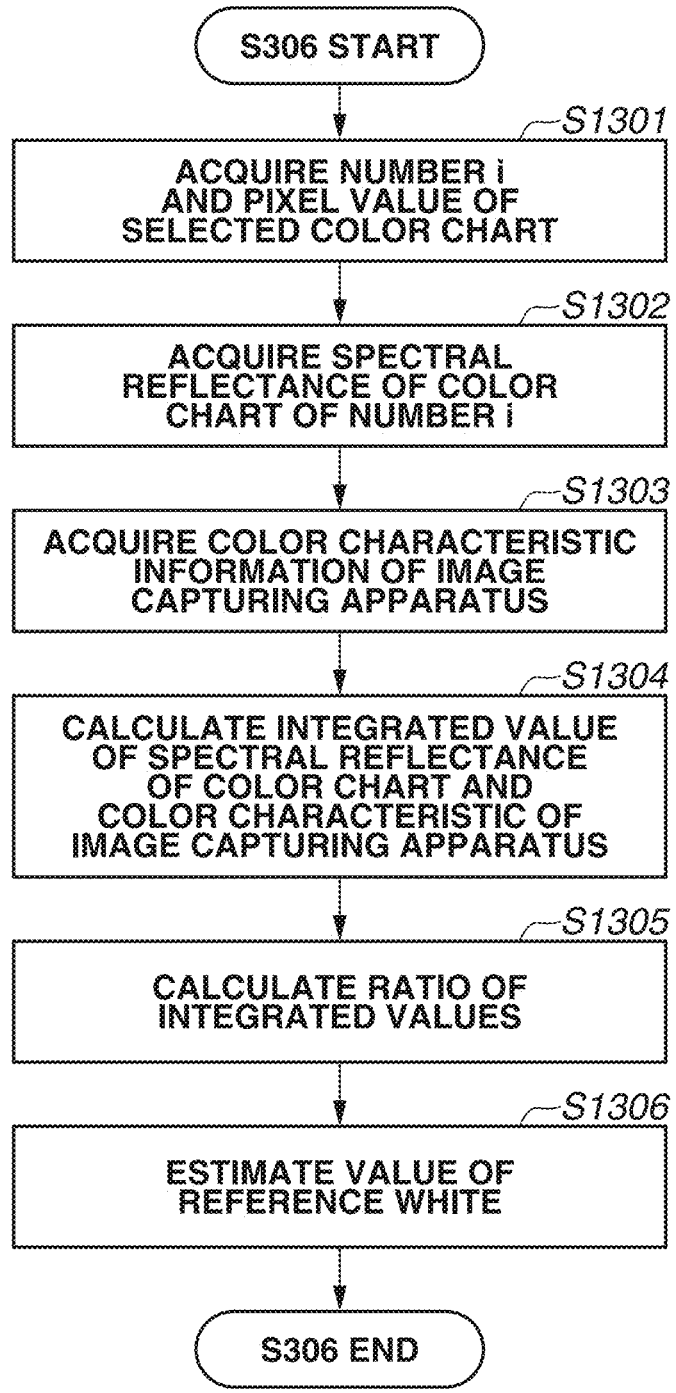
FIG. 13 is a flowchart illustrating processing for estimating a value of reference white.
Figure 14B:
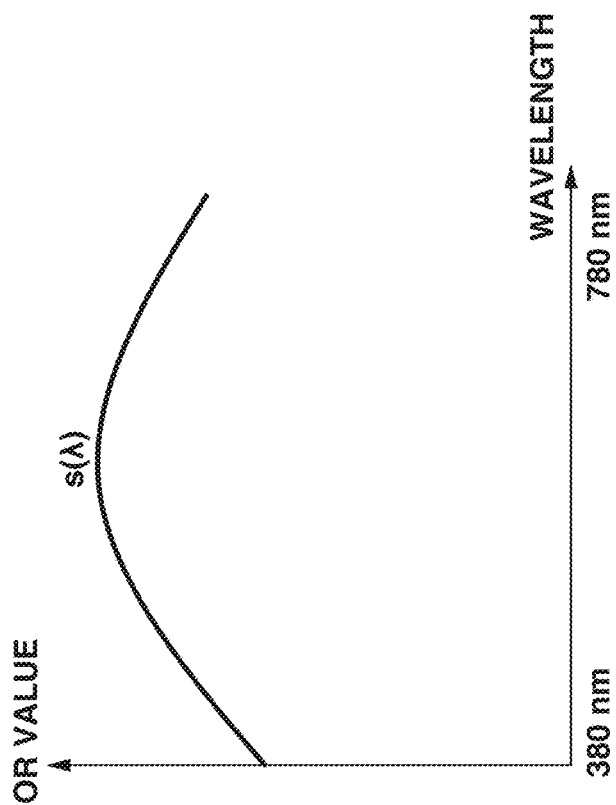
FIGS. 14A and 14B illustrate an example of color characteristics of an image capturing apparatus.
Figure 14A:
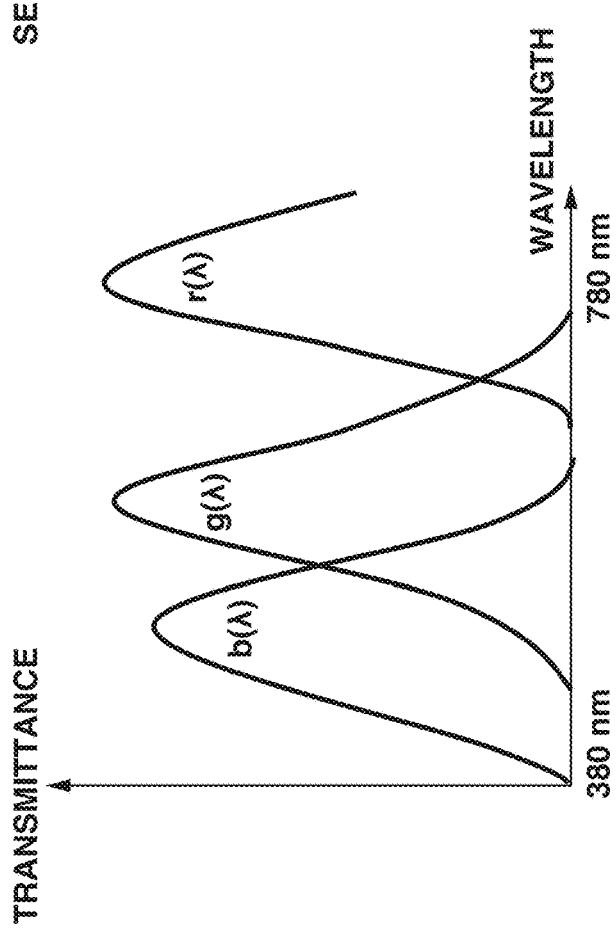

FIG. 13 is a flowchart illustrating processing for estimating the value of the reference white. In step S1301, the white estimation unit 204 acquires the number i and the pixel value of the color chart selected in step S305. In step S1302, the white estimation unit 204 acquires spectral reflectance R(λ) of the color chart of the number i. According to the present exemplary embodiment, it is assumed that the color chart of the number i=4 is selected in step S305, and the spectral reflectance of the color chart of the number i=4 is $R_4(λ)$. In step S1303, the white estimation unit 204 acquires color characteristic information indicating a color characteristic of the image capturing apparatus 105. The color characteristic of the image capturing apparatus 105 according to the present exemplary embodiment is spectral characteristics of a RGB color filter and an image sensor installed inside the image capturing apparatus 105. Light incident on the image capturing apparatus 105 is received by the image sensor via each color filter and converted into a color signal (i.e., a pixel value). A characteristic in the photoelectric conversion is generally a color reproduction characteristic specific to the image capturing apparatus 105. FIGS. 14A and 14B illustrate an example of the color characteristic of the image capturing apparatus 105. FIG. 14A illustrates an example of spectral characteristics (r(λ), g(λ), b(λ)) of the color filter, and FIG. 14B illustrates an example of a spectral characteristic s(λ) of the image sensor.

In step S1304, the white estimation unit 204 calculates an integrated value of the spectral reflectance $R_4(\lambda)$ of the color chart acquired in step S1302 and the color characteristics of the image capturing apparatus 105 using an equation (15):

$$\begin{cases} r_4 = \int_{380}^{780} R_4(\lambda)s(\lambda)r(\lambda)d\lambda \\ g_4 = \int_{380}^{780} R_4(\lambda)s(\lambda)g(\lambda)d\lambda \\ b_4 = \int_{380}^{780} R_4(\lambda)s(\lambda)b(\lambda)d\lambda \end{cases} \quad (15)$$

In the equation (15), ($r_4$, $g_4$, $b_4$) are integrated values of the spectral reflectance $R_4(\lambda)$ of the color chart and the color characteristics of the image capturing apparatus 105. The integrated values ($r_4$, $g_4$, $b_4$) indicate estimated pixel values in a case where the color chart is imaged using the image capturing apparatus 105 under a light source in which radiance is spectrally constant in the wavelength range of visible light.

In step S1305, the white estimation unit 204 calculates a ratio of the integrated value calculated in step S1304 and an integrated value corresponding to the reference white. First, the white estimation unit 204 calculates the integrated values ($r_W$, $g_W$, $b_W$) corresponding to the reference white using an equation in which $R_4(\lambda)$ in the equation (15) is changed to 1. Next, the white estimation unit 204 calculates ratios (ratio$_r$, ratio$_g$, ratio$_b$) by an equation (16) using the integrated values ($r_4$, $g_4$, $b_4$) corresponding to the color chart and the integrated values ($r_W$, $g_W$, $b_W$) corresponding to the reference white:

$$\begin{cases} ratio_r = r_W / r_4, \\ ratio_g = g_W / g_4, \\ ratio_b = b_W / b_4. \end{cases} \quad (16)$$

In step S1306, the white estimation unit 204 estimates the value of the reference white corresponding to imaging in the overexposure based on the ratios (ratio$_r$, ratio$_g$, ratio$_b$) using an equation (17):

$$\begin{cases} R_W = ratio_r * R_4, \\ G_W = ratio_g * G_4, \\ B_W = ratio_b * B_4. \end{cases} \quad (17)$$

Effect of Second Exemplary Embodiment

As described above, the image processing apparatus according to the present exemplary embodiment estimates the value of the reference white using the integrated value of the spectral reflectance of the color chart and the reference white and the color characteristics of the image capturing apparatus. Accordingly, even in a case where an inspection object has a dark color, and a group of color charts reflectance of which is different for each wavelength is used, a color value for evaluating the color of the inspection object can be acquired without separately performing imaging for the inspection object and for the reference white.

The color chart selection unit 203 according to the above-described exemplary embodiments determines whether the pixel value is saturated based on whether the pixel value is 255 (the maximum signal value). However, the determination may be performed using another method.

For example, depending on the image capturing apparatus, a pixel value may be saturated smoothly in lower luminance than a pixel value is actually saturated. In this case, it may be determined whether the pixel value is saturated based on a characteristic of the image sensor and a range of the pixel values in which linearity is maintained.

According to the above-described exemplary embodiments, the exposure information corresponding to the appropriate exposure is acquired by performing measurement using the exposure meter in advance, but may be acquired by photometry using a known 18% gray card.

According to the above-described exemplary embodiments, the format of the color profile is the 3*3 matrix, but may be a different format. For example, a look-up table (LUT) which maintains a correspondence relationship between RGB values (R, G, B) and CIE tristimulus values (X, Y, Z) may be used as the color profile. The LUT may maintain the correspondence relationship for all color combinations or for a representative color combination. In a case where the correspondence relationship is maintained for the representative color combination, the correspondence relationship for other colors is derived by an interpolation operation based on the correspondence relationship for the representative color combination.

According to the above-described exemplary embodiments, the color value for color evaluation is the CIELAB values, but a color value, for example, a CIELUV value and a CIE color appearance model (CIECAM) value may be used.

According to the above-described exemplary embodiments, the color value in the inspection target area is used as the evaluation value, but a plurality of inspection target areas may be set, and a color difference between each of the areas may be used as the evaluation value. In this case, the plurality of areas is specified in the specifying area 403 in the UI displayed on the monitor 108, and the CIELAB values of each specified area and the color difference between the specified areas are displayed on the color value display area 405. For example, if the respective CIELAB values of the two inspection target areas are ($L^*_1$, $a^*_1$, $b^*_1$) and ($L^*_2$, $a^*_2$, $b^*_2$), a color difference $\Delta E$ can be calculated using an equation (18):

$$\Delta E = \sqrt{(L^*_1 - L^*_2)^2 + (a^*_1 - a^*_2)^2 + (b^*_1 - b^*_2)^2}. \quad (18)$$

In addition to the color difference $\Delta E$ indicated in the equation (18), the color difference such as $\Delta E94$ and $\Delta E2000$ may be used. Further, the evaluation value is not limited to the color difference $\Delta E$, and a difference in each color element such as a lightness difference $\Delta L$, a color saturation difference $\Delta C$, and a hue difference $\Delta H$ may be used as the evaluation value.

According to the above-described exemplary embodiments, the average value of the pixel value group in the inspection target area is used as the pixel value corresponding to the inspection target area. However, the evaluation value may be calculated in units of pixels by performing the above-described series of processing on each pixel in the inspection target area instead of calculating the average value. In this case, the number of the evaluation values is enormous, so that the evaluation values in a graph such as a line profile and a color map are displayed.

The white estimation unit 204 according to the above-described second exemplary embodiment calculates the ratio of the integrated values in the processing for estimating the value of the reference white. However, the processing does not involve using captured image data acquired by imaging the inspection object, so that the processing in steps S1302 to S1305 may be performed in advance. In this case, the white estimation unit 204 can estimate the value of the reference white by performing the processing in steps S1301 and S1306 by acquiring the ratio of the integrated values calculated in advance.

According to the disclosure, even in a case where an inspection object has a dark color, a color value for evaluating the color of the inspection object can be acquired without separately performing imaging for the inspection object and for the reference white.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-153585, filed Sep. 14, 2020, which is hereby incorporated by reference herein in its entirety.

What is claimed is:

1. An apparatus for evaluating color of an object, the apparatus comprising:
at least one processor; and
at least one memory coupled to the at least one processor storing instructions that, when executed by the at least one processor, cause the at least one processor to function as:
an acquisition unit configured to acquire, from image data which is acquired by imaging the object and a color chart group including color charts having different reflectance within one angle of view, a pixel value of a pixel corresponding to each color chart included in the color chart group;
a selection unit configured to determine whether the pixel value of the pixel corresponding to the each color chart included in the color chart group is saturated based on a range of pixel values in which linearity is maintained;
an estimation unit configured to estimate a value of reference white under an exposure condition corresponding to the imaging based on a result of the determination; and
a calculation unit configured to calculate a color value for evaluating the color of the object based on the image data and the estimated value of the reference white.

2. The apparatus according to claim 1,
wherein the acquisition unit acquires, from the image data, a pixel value of a pixel included in a target area in the object,
wherein the estimation unit estimates the value of the reference white based on the pixel value of the pixel corresponding to each color chart included in the color chart group, and
wherein the calculation unit calculates the color value for evaluating the color of the object based on the pixel value of the pixel included in the target area in the object and the estimated value of the reference white.

3. The apparatus according to claim 1, wherein the selection unit selects a color chart for estimating the value of the reference white from the color chart group based on the image data,
wherein the estimation unit estimates the value of the reference white based on a pixel value of a pixel corresponding to the selected color chart.

4. The apparatus according to claim 3, wherein the selection unit determines whether a pixel value of a pixel corresponding to the color chart included in the color chart group is saturated based on the image data and selects, based on a result of the determination, the color chart for estimating the value of the reference white.

5. The apparatus according to claim 4, wherein the selection unit performs the determination of whether the pixel value of the pixel corresponding to the color chart included in the color chart group is saturated in descending order from a color chart having highest reflectance.

6. The apparatus according to claim 1,
wherein the acquisition unit acquires exposure information indicating the exposure condition corresponding to the imaging, and
wherein the calculation unit calculates the color value for evaluating the color of the object further based on the exposure information.

7. The apparatus according to claim 6,
wherein the acquisition unit acquires exposure information corresponding to appropriate exposure, and
wherein the calculation unit calculates the color value for evaluating the color of the object based on the exposure information indicating the exposure condition corresponding to the imaging and the exposure information corresponding to the appropriate exposure.

8. The apparatus according to claim 7, wherein the exposure condition corresponding to the imaging is an over exposure condition with respect to the appropriate exposure.

9. The apparatus according to claim 1, wherein the at least one processor further functions as a display control unit configured to control a display unit to perform display for receiving an instruction input regarding a target area in the object and the color chart group.

10. The apparatus according to claim 1, wherein the estimation unit estimates the value of the reference white further based on a color characteristic of a capturing apparatus that performs the imaging.

11. A method comprising:
acquiring, from image data which is acquired by imaging an object and a color chart group including color charts having different reflectance within a one angle of view, a pixel value of a pixel corresponding to each color chart included in the color chart group;
determining whether the pixel value of the pixel corresponding to the color chart included in the color chart group is saturated based on a range of pixel values in which linearity is maintained;
estimating a value of reference white under an exposure condition corresponding to the imaging based on a result of the determination; and
calculating a color value for evaluating the color of the object based on the image data and the estimated value of the reference white.

12. The method according to claim 11,
wherein the acquiring acquires, from the image data, a pixel value of a pixel included in a target area in the object,
wherein the estimating estimates the value of the reference white based on the pixel value of the pixel corresponding to each color chart included in the color chart group, and
wherein the calculating calculates the color value for evaluating the color of the object based on the pixel value of the pixel included in the target area in the object and the estimated value of the reference white.

13. The method according to claim 11, further comprising selecting a color chart for estimating the value of the reference white from the color chart group based on the image data,
wherein the estimating estimates the value of the reference white based on a pixel value of a pixel corresponding to the selected color chart.

14. The method according to claim 11,
wherein the acquiring acquires exposure information indicating the exposure condition corresponding to the imaging, and
wherein the calculating calculates the color value for evaluating the color of the object further based on the exposure information.

15. The method according to claim 11, further comprising controlling a display to perform display for receiving an instruction input regarding a target area in the object and the color chart group.

16. A non-transitory computer-readable storage medium storing instructions that, when executed by a computer, cause the computer to perform a method, the method comprising:
acquiring, from image data which is acquired by imaging include an object and a color chart group including color charts having different reflectance within a one angle of view, a pixel value of a pixel corresponding to each color chart included in the color chart group;
determining whether the pixel value of the pixel corresponding to the color chart included in the color chart group is saturated based on a range of pixel values in which linearity is maintained;
estimating a value of reference white under an exposure condition corresponding to the imaging based on a result of the determination; and
calculating a color value for evaluating the color of the object based on the image data and the estimated value of the reference white.

17. The non-transitory computer-readable storage medium according to claim 16,
wherein the acquiring acquires, from the image data, a pixel value of a pixel included in a target area in the object,
wherein the estimating estimates the value of the reference white based on the pixel value of the pixel corresponding to each color chart included in the color chart group, and
wherein the calculating calculates the color value for evaluating the color of the object based on the pixel value of the pixel included in the target area in the object and the estimated value of the reference white.

18. The non-transitory computer-readable storage medium according to claim 16, further comprising selecting a color chart for estimating the value of the reference white from the color chart group based on the image data,
wherein the estimating estimates the value of the reference white based on a pixel value of a pixel corresponding to the selected color chart.

19. The non-transitory computer-readable storage medium according to claim 16,
wherein the acquiring acquires exposure information indicating the exposure condition corresponding to the imaging, and
wherein the calculating calculates the color value for evaluating the color of the object further based on the exposure information.

20. The non-transitory computer-readable storage medium according to claim 16, further comprising controlling a display to perform display for receiving an instruction input regarding a target area in the object and the color chart group.

* * * * *